United States Patent [19]

Plevinsky

[11] Patent Number: 5,567,943
[45] Date of Patent: Oct. 22, 1996

[54] PERSONAL RADIATION DETECTION DEVICE

[76] Inventor: Craig A. Plevinsky, 7 Woodbury Dr., Cherry Hill, N.J. 08003

[21] Appl. No.: 552,946

[22] Filed: Nov. 3, 1995

[51] Int. Cl.$^6$ .................................................. G01T 1/202
[52] U.S. Cl. .................. 250/368; 250/370.11; 250/483.1
[58] Field of Search ................................... 250/368, 367, 250/370.11, 483.1, 486.1, 487.1; 378/97, 108

[56] References Cited

U.S. PATENT DOCUMENTS

| | | | |
|---|---|---|---|
| 3,345,516 | 10/1967 | Nicholson et al. | 378/108 |
| 3,765,006 | 10/1973 | Takahasi et al. | |
| 4,197,461 | 4/1980 | Umbarger et al. | |
| 4,320,393 | 3/1982 | Engdahl. | |
| 4,694,177 | 9/1987 | Akai | 250/370.11 |

FOREIGN PATENT DOCUMENTS 5-180947  7/1993  Japan ................. 250/370.11

Primary Examiner—Davis L. Willis
Assistant Examiner—Richard Hanig

[57] ABSTRACT

A personal radiation detection device is provided having a housing containing within at least one sheet of rare earth intensifying screen that interacts with ionizing radiation when present at a specified exposure level to generate visible light and a plurality of photoresistors which is sensitive to the visible light and conducts a voltage upon the detection of the light. A specular reflector such as reflective tape, foil, or a finely polished mirror is also provided to reflect any stray visible light in the direction of the photoresistors. The photoresistors send a signal through a resistor to an operational amplifier which then activates an indicator including a light and/or an audible buzzer. The lightweight housing may also be provided with a slot on an outside surface to hold standard photographic film used to monitor cumulative exposure to radiation. A battery is provided to generate power to operate the device.

17 Claims, 2 Drawing Sheets

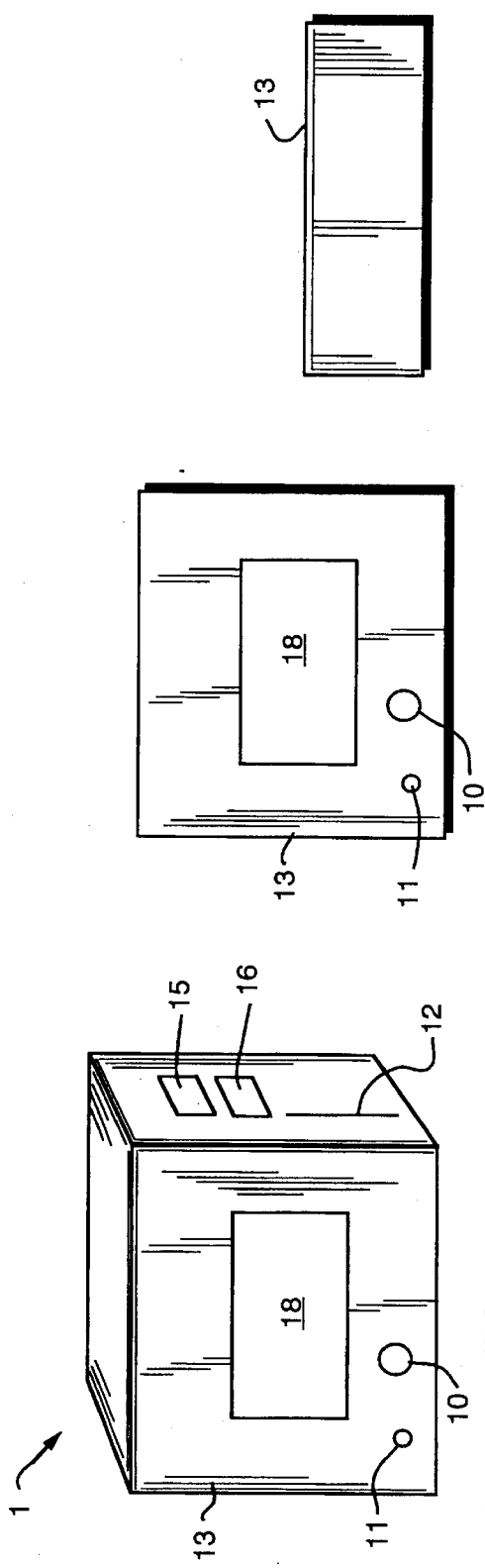
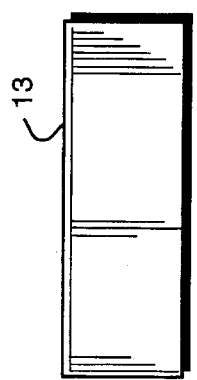
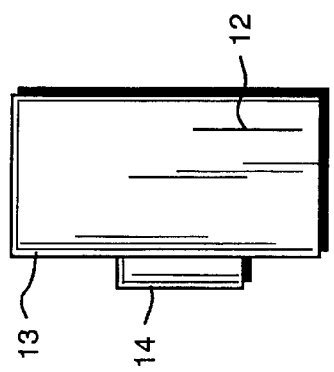
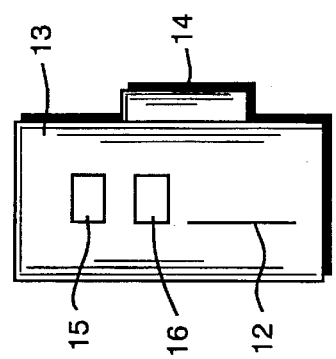
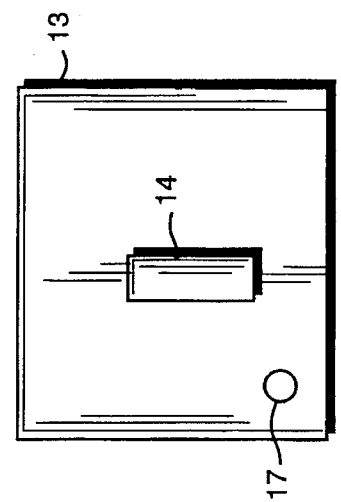

5,567,943

PERSONAL RADIATION DETECTION DEVICE

FIELD OF THE INVENTION

A personal radiation detection device is provided which provides an immediate indication of exposure to radiation at a particular level. The device is designed to detect ionizing radiation such as x- and gamma-rays. The device may be worn by an individual working in an environment where there is potential for exposure and emits an audible sound and/or visual warning in response to the presence of x-rays above a predetermined level. The device may be worn in conjunction with the standard film badge as a single unit.

BACKGROUND OF THE INVENTION

In certain work environments such as for example, healthcare workers involved with x-ray equipment, technicians, doctors and other operators of x-ray equipment including computed tomography operators, there is potential for exposure to ionizing radiation. Personnel in these areas must be constantly monitored to make sure that they are not exposed to radiation above specified limits.

The effect of exposure to ionizing radiation in humans is cumulative and the U.S. Government through the Occupational Safety and Health Administration has set acceptable limits for an average exposure over time (e.g., 10 rems/year for healthcare workers and 5 rems/year for the general population wherein rein is defined as roentgen equivalent man). To monitor worker exposure, workplaces require the use of film badges that are worn by the personnel. The film is sensitive to the ionizing radiation and after a certain interval of usage, the film is sent to a laboratory for analysis. The information concerning personnel exposure is thus not readily available and actual information concerning an exposure may not be received until months after the exposure had occurred. No information would be available at the immediate time of exposure.

Various types of portable monitoring equipment have become available such as, for example, Geiger counters and ionization chambers that provide information concerning an instantaneous value of a radiation field. These devices are large and cumbersome and cannot be worn by personnel in the working environment. Other devices have been developed utilizing sophisticated crystals and semiconductors in which exposures to photon radiation are converted into electronic and audible signals to indicate that threshold levels have been exceeded. Other personal dosimeters include complicated time measuring devices that provide additional information to the user or depend on a one-to one relationship on the energy spectrum of a radiation capable of being received by a detector.

Many of these devices provide instantaneous readings of exposure levels but are cumbersome to wear and are also very expensive. Often these devices require a detective element to be charged or regenerated. Other devices require many mechanical parts that are susceptible to breakage. Finally, many of these devices do not provide for any test features to assure that the equipment is in proper working order. Thus many of these types of personal dosimeters have not been commercially successful.

There is a need for a personal detection device to monitor exposure to ionizing radiation that provides immediate information concerning exposure over the acceptable threshold limit that is lightweight and easy to operate. There is also a need for a detection device that provides for monitoring cumulative exposure to radiation in addition to providing immediate information.

SUMMARY OF THE INVENTION

A radiation detection device is provided having a housing containing within at least one sheet of ram earth intensifying screen that interacts with ionizing radiation when present at a specified exposure level to generate visible light and a plurality of photoresistors that is sensitive to the visible light and conducts voltage upon the detection of light. A specular reflector such as reflective tape, foil, or a finely polished mirror is also provided to reflect any stray visible light in the direction of the photoresistors. The photoresistors conduct a signal to a resistor and an operational amplifier which then in conjunction with a variable resistor activates an indicator including a light and/or an audible buzzer to alert the user of an overexposure to ionizing radiation. The small housing may also be provided with a slot on an outside surface of the housing to hold standard photographic film used to monitor cumulative exposure to radiation. A battery source is provided to generate power to operate the device.

The sheet of rare earth phosphor is preferably a screen of Gadolinium oxysulfide:terbium activated ($Gd_2O_2S$:Tb). The photoresistors are preferably cadmium sulfide (CaS). Three 3-volt lithium batteries are the preferred power source.

BRIEF DESCRIPTION OF THE DRAWINGS

FIG. 1 is a perspective view of the monitoring device having a housing to which a clip is adhered for affixing to the person wearing the device.

FIG. 1a is a front view of the monitoring device shown in FIG. 1.

FIG. 1b is a top view of the monitoring device shown in FIG. 1.

FIG. 1c is a back view of the monitoring device shown in FIG. 1.

FIGS. 1d and 1e are side views of the monitoring device shown in FIG. 1.

DETAILED DESCRIPTION OF THE INVENTION

Figure 2:
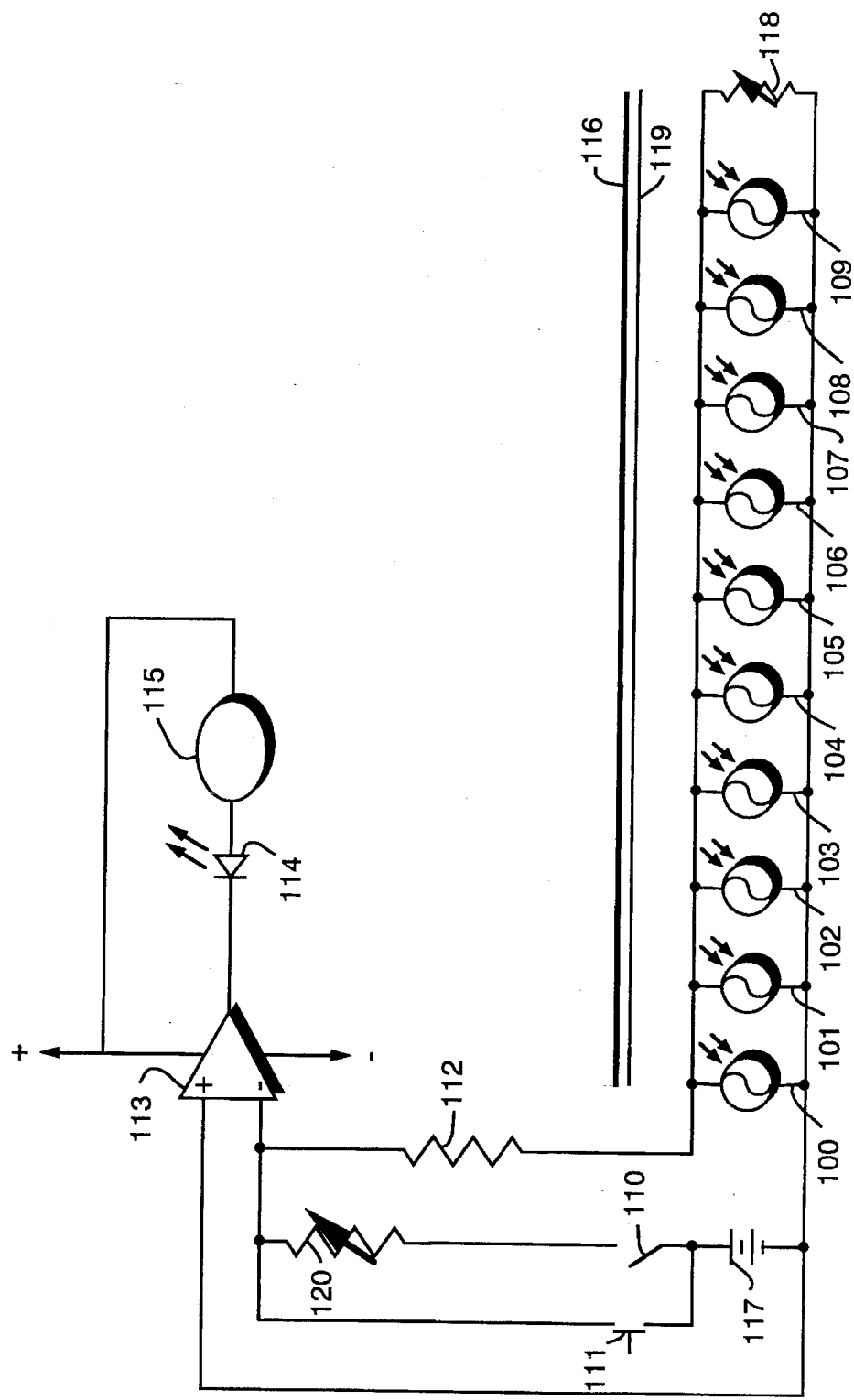
FIG. 2 is a schematic diagram of the circuits of the device of FIG. 1.

A detection device is provided to alert personnel of immediate exposure to ionizing radiation at a predetermined level. The ionizing radiation sought to be detected is in the range between 25 keV through about 100 keV, which is equivalent to a wavelength of 10 nm or less and includes x-ray and gamma-ray radiation. Radiation in this range can be harmful to the human body. The device herein described provides an early warning signal to immediate exposure and also is capable of providing quantitative information concerning any exposure.

The invention is best understood by reference to the accompanying drawings. FIG. 1 shows a perspective of the device 1 in which all of the operational elements are housed within a plastic housing or casing 13 on a printed circuit board located within the housing 13 directly behind window 18 of the housing. This device enables the personal measurement of exposure (dose) to ionizing radiation including x-rays and gamma radiation. The description of the operation of the device described herein utilizes x-rays as the ionizing radiation and is designed to detect a dose rate of 310 mrem/min or more. The housing 13 is designed so that no ambient light is permitted to enter into the interior which is the location of the main circuitry. The device 1 with housing 13 is attached to the user via a clip 14 located at the back of the housing 13 (as shown in FIG. 1c). Alternate means of attaching the housing 13 to the user may also be employed such as pins or the use of interlocking loops and hooks such as Velcro® tabs. A battery compartment 17 is provided for the ease of replacing the batteries (as shown in FIG. 1c).

Also visible on the outside surface of the device 1 is an audible indicator 11 and a visual indicator 10 (as shown in FIG. 1a). The audible indicator 11 may include any noise generating device that is miniaturized so that it fits within the housing 13 such as for example, a piezo buzzer, an electro-mechanical buzzer, or a piezo transducer. This audible indicator 11 is triggered by the detection of ionizing radiation above a predetermined level. Similarly, the visual indicator 10 may include any light generating device that is miniaturized so that it also fits within the housing 13 such as for example a light-emitting diode (LED). Although FIG. 1 shows that both the audible and visual indicators are present, the inventive device may also function equally well with only one of the indicators present, either the audible or visual.

An optional feature includes a slot 12 for holding a conventional radiation film badge, as described above, which is worn for a period of time (i.e., 30 to 90 days) and then sent to a laboratory for analysis. The film is visible through window 18 on the front face of the housing as can be seen in FIGS. 1 and 1a. Additional information concerning the user may also be visible from the window. Also located on the side of the housing 13 are the power switch 15 and test switch 16. These can be seen in FIG. 1d. FIG. 1e shows the opposing side of the housing. The housing 13 is sealed around the side edges and bottom with conventional sealing means so that it is substantially impermeable to light. The ionizing radiation preferably penetrates the top of the housing 13 (FIG. 1b) where the ionizing radiation then interacts with the elements contained within the housing. Although it is preferred that the ionizing radiation enter the top of the housing for maximum sensitivity, the device is capable of functioning albeit with slightly less sensitivity if the radiation enters from other areas of the housing.

Referring to FIG. 2, the ionizing radiation (as described herein, x-rays having a wavelength of 10 nm or below) enters the housing and impinges on the rare earth intensifying screen 119. The rare earth intensifying screen 119 is preferably a phosphor screen made of Gadolinium oxysulfide:terbium activated $Gd_2O_2S$:Tb, a photographic material commercially available from Eastman Kodak Corporation of Rochester, N.Y. The rare earth material is available in different speeds depending on the application. For the inventive ionizing radiation detection device, the minimum speed of the screen should be of a 400 speed class. Screens 119 with higher speeds are more sensitive and thus interact with the ionizing radiation to produce more visible light than lower speed class screens. Thus screens 119 with speeds of 800 are preferred and screens of 1200 or greater are most preferred. Only one screen 119 of speed 800 or greater is required within the housing. A second screen may be added if desired.

The screen 119 may generally have a thickness of between 4 to 6 mils. A thicker screen with a thickness of up to 10 mils may lead to a more sensitive screen. The screen also has a conversion efficiency of 18%. Screens with higher conversion efficiencies may also yield more sensitive screens. Alternatively, screens having a heavy metal higher than that of gadolinium (Gd with an atomic number of 64)

such as lead may also be employed thus improving the sensitivity of the rare earth intensifying screen.

When the radiation energy impinges on the rare earth intensifying screen 119, the energy reacts with the screen to produce a green light in the visible light spectrum. Specifically, the x-ray energy impinges on the rare earth screen 119 causing the originally white surface with no light emission to emit a green light with a wavelength of 544 nm. The light produced by the interaction of the x-ray photons and the screen is emitted in all directions.

The light emitted by the rare earth screen 119 is detected by the Cadmium Sulfide (CaS) photoresistors 100–109. The number of photoresistors may vary depending on the particular application and dose rate to be detected. The light detected by these photoresistors is further enhanced with the use of a specular reflector 116 that is positioned in an overlapping manner with the rare earth screen 119 so that any light emitted towards the reflector 116 is reflected back towards the photoresistors 100–109 which are located on the other side of the rare earth screen 119. The specular reflector 119 is a reflecting surface and includes such materials as a shiny metal reflecting tape or foil and is most preferably a finely polished mirror.

The CaS photoresistors 100–109, most sensitive to light in the 565 nm wavelength spectrum, are situated in parallel on one side of the rare earth screen 119 so as to quickly reduce the resistance in the circuit when exposed to light according to the formula:

$$R_{total} = \frac{1}{1/R_1 + 1/R_2 + \ldots 1/R_{10}}$$

The photoresistors begin to conduct voltage immediately upon detecting the light having a wavelength of approximately 544 nm. A variable resistor 118, in parallel with the photoresistors 100–109 is employed to reduce the total resistance of the photoresistors to a threshold slightly below that of causing the 741 operational amplifier 113 to change its output. The 741 operational amplifier is manufactured by Tandy Corporation and commercially available from Radio Shack stores located throughout the United States. The voltage is detected across resistor 112 which is connected to the input of the operational amplifier 113.

A variable resistor 120 is provided to apply voltage to the input of the operation amplifier 113. The operational amplifier 113 switches its output when the voltage rises to a predetermined voltage. For the specific application, the variable resistor 120 provides 1.90 volts and the photoresistors upon the detection of the green light generates at least 0.05 volts which are detected by the resistor 112. Thus 1.95 volts are provided to the operational amplifier 113 which causes the operational amplifier to switch its output from high to low and closes the loop thus supplying sufficient voltage for the visual indicator (LED 114) and audible indicator (piezo buzzer 116) to be activated.

A conventional battery source 117 (FIG. 2) is used to supply the necessary power to operate the detector 1. A particularly preferred battery source consists of three 3 volt lithium button cell batteries. To test the operation of the device, a test switch 111 may be momentarily closed to provide a 9 volt potential on the input of the operational amplifier 113 and trigger the LED 114 and acoustic buzzer 115 to emit light and noise. The power switch 110 when closed supplies the 9 volts necessary to operate the device. When the power switch is open, the circuitry is interrupted and the device is rendered inoperative.

In operation, ionizing radiation enters the device through the top permeable section as shown in FIG. 1. The energy impinges upon the rare earth intensifying screen 119 and interacts with the rare earth screen such that visible light having a wavelength of about 544 nm (green light) is produced. The light produced is emitted in all directions such that it is detected by the CaS photoresistors 100–109. Stray light is also reflected back to the CaS photoresistors by the specular reflector 116. The photoresistors 100–109 are highly sensitive to light of the particular wavelength and upon detection of the light, the photoresistors begin to conduct a voltage. The photoresistors are in parallel to that the resistance decreases very rapidly causing accelerated conduction. The resultant voltage is detected across resistor 112. The amount of voltage detected across resistor 112 is dependent upon the dose rate of ionizing radiation detected by the device such that a higher dose rate will cause a brighter rare earth screen and higher voltage generated.

Variable resistor 118 is calibrated so that the total resistance of the photoresistors 100–109 is reduced to slightly below the threshold of conductance. The variable resistor 120 puts a bias voltage of 1.90 volts on the inverted input (−) of the operational amplifier 113. The non-inverted input (+) has a zero potential. When resistor 112 has a voltage of more than 0.05 volt potential across it, the inverted input (−) has a 1.95 volt potential at that input and the output goes to zero volts causing the LED 114 and acoustic buzzer 115 to function.

When the energy rate falls below 310 mR/min, the photoresistors cease to conduct which causes deactivation of the LED and buzzer.

The device is worn on the user's collar or waist band or belt. The overall weight of the device is approximately 31 grams.

Other features of the invention will be apparent from the description, drawings and claims. Embodiments of the invention utilizing the same or equivalent principles may be used and structural changes may be made as desired by those skilled in the art without departing from the present invention and the purview of the appended claims.

I claim:

1. A miniaturized ionizing detection device comprising:
   a. a housing forming an enclosure with an area that is accessible to the entry of ionizing radiation;
   b. at least one layer of a rare earth intensifying screen having a speed class that is contained within the housing;
   c. a specular reflector that is positioned in an overlapping manner on one side of the rare earth intensifying screen such that any visible light generated is reflected back towards the screen;
   d. a plurality of photoresistors located adjacent the rare earth intensifying screen on the side of the screen opposite the specular reflector, said photoresistors being in parallel, said photoresistors capable of detecting light generated and conducting voltage upon detection;
   e. a resistor that is connected to the plurality of photoresistors and reduces the resistance of the plurality of photoresistors;
   f. an operational amplifier connected to the resistor having an input that rises upon generation of voltage and an output;
   g. a variable resistor connected to the operational amplifier that supplies a voltage level to the input of the operational amplifier
   h. a battery source contained within the housing having sufficient voltage to operate the device; and
   i. at least one indicator selected from the group including visible and audible indicators, said indicator contained within the housing and having an alarm detectable on an outside surface of the housing.

2. A miniaturized ionizing detection device as described in claim 1 further comprising two layers of the rare earth intensifying screen each having a speed class.

3. A miniaturized ionizing detection device as described in claim 1 wherein the rare earth intensifying screen is a phosphor screen of Gadolinium oxysulfide:terbium activated.

4. A miniaturized ionizing detection device as described in claim 1 wherein the specular reflector is selected from the group including reflective tapes, reflective foils, and finely polished mirrors.

5. A miniaturized ionizing detection device as described in claim 1 wherein the photoresistors are cadmium sulfide photoresistors.

6. A miniaturized ionizing detection device as described in claim 5 wherein the device has 10 cadmium sulfide photoresistors.

7. A miniaturized ionizing detection device as described in claim 1 wherein the battery source includes three lithium batteries.

8. A miniaturized ionizing detection device as described in claim 1 further comprising a slot on an outside surface of the housing, said slot having an exposed face and a photographic film contained within the slot and visible through the exposed face to absorb ionizing radiation.

9. A miniaturized ionizing detection device as described in claim 1 further comprising a means for attaching the device to a user.

10. A miniaturized ionizing detection device as described in claim 9 wherein the means for attaching include clips, pins, and interlocking hooks and loops.

11. A miniaturized ionizing detection device as described in claim 1 wherein the audible indicator is selected from the group consisting of piezobuzzers, electro-mechanical buzzers, and piezo transducers.

12. A miniaturized ionizing detection device as described in claim 1 wherein the visible indicator is a light emitting diode.

13. A miniaturized ionizing detection device as described in claim 1 wherein the speed class of the rare earth intensifying screen is at least 400.

14. A miniaturized ionizing detection device as described in claim 1 wherein the speed class of the rare earth intensifying screen is at least 800.

15. A miniaturized ionizing detection device as described in claim 1 wherein the speed class of the rare earth intensifying screen is at least 1200.

16. A miniaturized ionizing detection device as described in claim 3 wherein the phosphor screen has a thickness of at least 4 mils and a conversion efficiency of at least 18%.

17. A miniaturized ionizing detection device as described in claim 1 wherein the rare earth intensifying screen is a lead screen.

\* \* \* \* \*